United States Patent [19]

Myerson et al.

[11] Patent Number: 4,698,321
[45] Date of Patent: * Oct. 6, 1987

[54] REGENERATION OF HDS CATALYSTS

[75] Inventors: Allan S. Myerson, Brooklyn, N.Y.; William R. Ernst, Roswell, Ga.

[73] Assignee: Georgia Tech Research Corporation, Atlanta, Ga.

[*] Notice: The portion of the term of this patent subsequent to Dec. 17, 2002 has been disclaimed.

[21] Appl. No.: 763,514

[22] Filed: Aug. 8, 1985

Related U.S. Application Data

[63] Continuation-in-part of Ser. No. 517,027, Jul. 25, 1983, Pat. No. 4,559,313, which is a continuation-in-part of Ser. No. 313,458, Oct. 21, 1981, abandoned.

[51] Int. Cl.$^4$ .......................... B01J 23/94; B01J 21/20; B01J 38/64; C10G 45/08

[52] U.S. Cl. .................................. 502/25; 208/216 R; 502/27; 502/31; 502/516

[58] Field of Search ....................... 502/25, 27, 28, 31, 502/516; 208/216; 423/68, 150; 75/101 BE, 104

[56] References Cited

U.S. PATENT DOCUMENTS 4,559,313  12/1985  Myerson et al. ...................... 502/25

Primary Examiner—P. E. Konopka
Attorney, Agent, or Firm—Newton, Hopkins & Ormsby

[57] ABSTRACT

Regeneration of HDS catalysts by sulfiding under controlled conditions and leaching the sulfided catalyst with an acidic aqueous ferric ion containing solution to remove contaminating nickel and vanadium compounds and recovering catalyst of increased BET surface area and pore diameter.

13 Claims, No Drawings

REGENERATION OF HDS CATALYSTS

CROSS REFERENCE TO RELATED APPLICATIONS

This application is a continuation-in-part of our copending application of Ser. No. 517,027, filed July 25, 1983, now U.S. Pat. No.4,559,313, issued Dec. 17, 1985 and which was itself a continuation-in-part of application Ser. No. 313,458 filed Oct. 21, 1981, now abandoned.

BACKGROUND OF THE INVENTION

Field of the Invention

The present invention relates to a method of regenerating porous hydrodesulfurization (HDS) catalysts having an alumina substrate or base which have been deactivated incidental to use in a hydrodesulfurization process by build-up of exogenous nickel and vanadium compounds on the surface of and in the pores of the HDS catalyst.

Copending application Ser. No. 517,027, the content of which is hereby incorporated by reference in this application, teaches a method of removing unwanted nickel and vanadium from spent HDS catalysts including pretreatment steps such as washing the spent HDS catalyst with solvent to remove residual oil, calcining the pretreated, spent HDS catalyst to remove coke and sulfiding the spent HDS catalyst, prior to leaching the spent HDS catalyst in an acidic solution containing ferric ions to solubilize metal sulfides and from which solution the regenerated HDS catalyst is recovered. The sulfiding step is taught to be essential but the other two pretreatment steps are taught to be optional.

The above application discloses such treatment both in the context of metals removal for its own sake and metals removal for regenerating the HDS catalyst.

BRIEF SUMMARY OF THE INVENTION

Successful regeneration of spent HDS catalyst requires that the HDS catalyst be restored sufficiently to that condition which allows the recovered HDS catalyst to operate for its intended purpose. The mere removal of a sufficient amount of the contaminating material from the spent HDS catalyst to otherwise allow the regenerated HDS catalyst to be effective once again is not enough. The porous nature of the spend HDS catalyst must also be significantly enhanced if regeneraton is to be successful. We have found that the average pore diameter of the regenerated catalyst invariably is increased in accord with this invention as compared to the original catalyst material so that it is not possible to restore this parameter to the original value. However, we have found that if the BET surface area of the regenerated catalyst is significantly enhanced over the value from that displayed by the spend catalyst, the porous nature of the regenerated catalyst will be sufficient to operate successfully in the HDS process. The spent HDS catalyst typically will display a BET surface area much lower than that which the HDS catalyst originally possessed and we have found that the combination of enhanced BET surface area and the increased pore diameter resulting from the regeneration results in a regenerated catalyst which is reusable in the HDS process. As used hereinafter, the term "porosity" as relating to regenerated HDS catalyst means that the increased pore diameter in combination with the enhanced BET surface area is effective to allow the regenerated HDS catalyst to operate effectively in the HDS process.

Accordingly, it is of principal concern in this invention to so control and/or combine the regeneration steps as will achieve the requisite regenerating removal of the contaminating vanadium and nickel compounds while also enhancing the BET surface area of the spent HDS catalyst sufficiently to allow the regenerated HDS catalyst to be reused for its intended purpose.

Basically, the present invention is concerned with the combination of and control of the pretreatment step or steps which are employed prior to the leaching step which effects the removal of the metals from the HDS catalyst being regenerated and in particular to control the conditions under which the sulfiding pretreatment is carried out. These controls are effected to achieve the requisite metals removal while also assuring that the alumina substrate of the HDS catalyst is not degraded, particularly as to porosity, as to render it unless for further catalytic operation. In this context, the invention relates generally to HDS catalysts employing an alumina substrate and which have been become contaminated with nickel and vanadium compounds during operation in the HDS process. Thus, this invention relates not only to such HDS catalysts as cobalt/molybdenum HDS catalysts but also to nickel/molybdenum and nickel/tungsten HDS catalysts.

The invention accomplishes its objective of removing nickel and vanadium compounds from the surface and pores of the HDS catalyst and correspondingly enhancing the BET surface area without significant removal of the alumina base by selecting and controlling the processing steps. It has been found that for best contaminant metals removal, the pretreatment steps of calcining following by sulfiding or of sulfiding alone, prior to the leaching, is most effective. With respect to protection of the alumina substrate and restoration of the porosity characteristics of the HDS catalyst material, the sulfiding step and in particular the temperature at which it is carried out is vital. Moreover, it has been found that protection of the alumina substrate is also effected if the oil from the catalysis process is not removed, i.e., if the spend HDS catalyst is not washed with a solvent such as toluene or the like as a pretreatment step. However, it may be necessary in a particular case to wash the spent HDS catalyst with solvent prior to the sulfiding step and subsequent leaching step in order to achieve the desired degree of regeneration. Therefore, the proper balancing of the pretreatment steps, including the conditions carried out during them is essential to successful regeneration of the spent HDS catalyst.

DETAILED DESCRIPTION OF THE INVENTION

A cobalt/molybdenum hydrodesulfurization catalyst which had been deactivated by the build-up of nickel and vanadium metal impurities had the following vanadium and nickel concentrations:

V 13.98%
Ni 3.04%

The fresh HDS catalyst before it was put in the commercial unit had a pore volume of 0.5 $cm^3$/gram as determined by mercury porosimetry, an average pore diameter of 70 Angstroms, and a BET surface area of 200 $m^2$/gram. The deactivated sample had a surface area of 83 $m^2$/gram.

EXAMPLE 1

The aforesaid spent cobalt/molydenum HDS catalyst as received was sulfided at various temperatures. The sulfiding was effected by heating a tube packed with the spent HDS catalyst while passing nitrogen through the tube until the spent catalyst bed had attained the sulfiding temperature noted below, whereafter a hydrogen sulfide/nitrogen mixture containing 5% hydrogen sulfide was passed through the HDS catalyst bed at a flow rate of 10 cm$^3$/min per gram of HDS catalyst for 16 hours, followed by cooling the HDS catalyst bed to 56° C. with nitrogen. The total amount of hydrogen sulfide per gram of HDS catalyst was therefore 480 cm$^3$/gm. The samples were then leached for 1 minute at 100° C. in an aqueous solution containing 0.67 grams of ferric ions per gram of HDS catalyst and 0.02% sulfuric acid by volume. The purpose of these experiments was to determine the effects of sulfiding conditions on the removal of the metal and on the HDS catalyst BET surface area after leaching and for this reason, the concentration of sulfuric acid and the time of leaching were maintained low to assure a good comparison among the percent metals removal.

The results were as follows:

TABLE A

| Sulfiding Temperature | Percent Metals Removal | | | | |
|---|---|---|---|---|---|
| °F. | Ni | V | Co | Al | Mo |
| 720 | 6.3 | 7.1 | 2.5 | 1.1 | 1.9 |
| 1300 | 13.1 | 10.7 | 6.5 | 1.3 | 1.7 |
| 1600 | 12.2 | 24.1 | 8.9 | 1.6 | 4.0 |

TABLE B

| Sulfiding Temperature °F. | BET Surface Area m$^2$/gram |
|---|---|
| 720 | 125.1 |
| 1300 | 113.1 |
| 1600 | 42.6 |

Table A shows that removal of all the metals listed increases with increasing sulfiding temperature but Table B shows that sulfiding at temperatures above 1300° F. (i.e., approximately 700° C.) seriously destroys the pore structure as is evidenced by the significantly decreased BET surface area at 1600° F. which is less than the BET surface area of the spent catalyst (83 m$^3$/gm). All other temperatures above show an increase of BET surface area over the BET surface area of the spent catalyst before treatment. However, the increase in BET surface is not great enough to equal or exceed the BET surface area of 200 m$^3$/gm for the original catalyst, although the regenerated HDS catalyst may be made according to this invention to exhibit a porosity sufficient to enable its reuse as an HDS catalyst.

EXAMPLE 2

This example is concerned with the effects of the three pretreatment steps of washing, calcining and sulfiding on the metals removal, surface area, and pore volume obtained for the cobalt/molybdenum HDS catalyst after leaching and the effect of combining these pretreatment steps in various combinations. The washing was effected by boiling 250 ml of toluene to which 10 grams of spent HDS catalyst was added. This mixture was stirred at boiling temperature for 15 minutes after which the spent HDS catalyst was filtered from the mixture and the process was repeated with fresh toluene. The calcining was effected by packing the spent HDS catalyst in a tube, passing an air/nitrogen mixture through the tube at a flow rate of 100 cm$^3$/min per gram of HDS catalyst for two hours while the tube was heated. The oxygen content of the air/nitrogen mixture was varied within the range of 0.5 to 1.5 mol percent to maintain the HDS catalyst bed at about 400° C. but not to exceed about 455° C. The sulfiding was effected by heating at tube packed with HDS catalyst while passing nitrogen through the tube until the HDS catalyst bed had attained a temperature of about 700° C., whereafter a hydrogen sulfide/nitrogen mixture containing 5% hydrogen sulfide was passed through the HDS catalyst bed at a flow rate of 10 cm$^3$/min per grame of HDs catalyst for 16 hours, followed by cooling the HDS catalyst bed to 56° C. with nitrogen. As in Example 1, the total amount of hydrogen sulfide was 480 cm$^3$ per gram of HDS catalyst. The leaching was effected by vigorously stirring the HDS catalyst (magnetically) in an aqueous solution containing 0.5 grams ferric ions per gram of HDS catalyst and 0.5% sulfuric acid by volume, at a temperature of 100° C. for twenty minutes. As opposed to the leaching conditions of Example 1, the leaching of this Example was at a sulfuric acid concentration and for a time such that percent metals removal was high. The results are set forth in the following Tables C and D:

TABLE C

| Pretreatment | Percent Metals Removal | | | | |
|---|---|---|---|---|---|
| | Ni | V | Co | Al | Mo |
| None | 54.6 | 68.9 | 48.3 | 20.3 | 2.8 |
| Sulfided | 44.5 | 62.8 | 48. | 9.6 | 0.9 |
| Calcined | 27.5 | 17.2 | 53.6 | 14.5 | 17.6 |
| Toluene washed | 59.1 | 71.2 | 52.3 | 21.8 | 8.5 |
| Calcined & Sulfided | 65.3 | 100.0 | 65.8 | 4.6 | 9.8 |
| Toluene washed & Calcined | 22.2 | 16.7 | 49.9 | 12.5 | 17.6 |
| Toluene Washed & Sulfided | 47.6 | 64.1 | 50.4 | 15.5 | 1.0 |
| Toluene Washed, Calcined & Sulfided | 55.5 | 89.6 | 62.6 | 3.2 | 9.8 |

The results of Table C indicate that with no pretreatment prior to the leaching step, excellent removal of the contaminating metals nickel and vanadium is effected, but that the removal of aluminum is intolerably high, i.e., removal and degradation of the alumina substrate occurs as is evident from Table D. With sulfiding alone preceeding the leaching step, somewhat less nickel and vanadium are removed but this is accompanied by a significant reduction of aluminum and molybenum removals, there being substantially no change in cobalt removal. Thus, the pretreatment step of sulfiding alone is clearly indicated inasmuch as it clearly protects the alumina as well as the molybdenum.

Calcining alone preceeding the leaching step significantly reduces both nickel and vanadium removal while significantly increasing the molybdenum removal and on these bases alone cannot be indicated as a pretreatment step to be performed alone.

Toluene washing alone preceeding the leaching step favorably affects the removal of nickel and vanadium, somewhat increases removal of cobalt, but intolerably increases removal of aluminum and significantly increases removal of molybdenum. Thus, washing alone as a pretreatment step also is not indicated.

Although calcining alone is unfavorable as noted above, the combination of calcining followed by sulfiding is suprising in that it very favorably affects removal of both nickel and vanadium (compared with sulfiding or calcining alone) while also tending to minimize aluminum removal and decreasing molybdenum removal as compared with that indicated for calcining alone. Thus, this combination of pretreatment steps is highly desirable.

Table C illustrates the cobalt removal is largely unaffected by the pretreatment steps except in the cases of calcining followed by sulfiding and of washing followed by calcining and sulfiding.

If an active component metal of the HDS catalyst is nickel, the combination of washing, calcining and sulfiding as pretreatment steps, in the order listed, would be indicated as desirable from Table C because vanadinum removal is still high whereas nickel removal has been reduced somewhat. Similarly, the combination of washing followed by sulfiding as pretreatment steps may also be desirable with HDS catalysts in which nickel is involved in the HDS catalyst activity. On the other hand, the combination of washing followed by calcining is not indicated in any event because of the low removal of either nickel or vanadium and the intolerably high removal of molybdenum.

TABLE D

| Pretreatment | Surface Area m$^2$/gm | Mean Pore Radius Angstroms |
|---|---|---|
| None | 148.6 | 96 |
| Sulfided | 128.5 | 126 |
| Calcined | 102.5 | 95 |
| Toluene Washed | 150.1 | 118 |
| Calcined & Sulfided | 51.6 | 1598 |
| Toluene Washed & Calcined | 102.8 | 155 |
| Toluene Washed, Calcined & Sulfided | 64.4 | 3125 |

Bearing in mind that the BET surface area of the spent HDS catalyst was 83 m$^3$/gm, Table D indicates that two of the pretreatment combinatios indicated by Table C to be most effective (calcined and sulfided and washed, calcined and sulfided) significantly decrease the BET surface area of the catalyst. However, as will be shown later, sulfiding temperature control is effective to cure this defect of these two pretreatment combinations. Thus, the above-noted combinations of pretreatment steps or of a pretreatment step alone prior to leaching as indicated from Table C hold for the regeneration of HDS catalysts using an alumina substrate in association with the usual active metal ingredient of molybdenum. As noted, the precise pretreatment or combination of steps may depend upon the presence of other active metal ingredients of the particular HDS catalyst under consideration. Since hydrodesulfurization catalysts with which the present invention is concerned normally are contaminated to the greatest degree by vanadium and to a lesser degree by nickel, any of the above pretreatments may be indicated even if nickel or cobalt is another active metal ingredients of the HDS catalyst.

In any event, the above Tables show that the best removals of vanadium and nickel are obtained by calcining followed by sulfiding or by sulfiding alone. It is important to note that sulfiding serves to protect the aluminum and molybdenum from leaching as well as helping in the removal of vanadium and nickel. In addition, leaving the residual oil on the HDS catalyst rather than removing it by toluene washing also serves to protect the original HDS catalyst material. Thus, it is clearly indicated that the sulfiding step is of paramount importance.

EXAMPLE 3

A cobalt/moldbenum HDS catalyst sample as received was sulfided as in Example 2 but at reduced temperature of about 556° C., followed by leaching as in Example 2.

The results were as follows:

TABLE E

| | Percent Metals Removal | | | | |
|---|---|---|---|---|---|
| Pretreatment | Ni | V | Co | Al | Mo |
| Sulfided | 47.9 | 44.4 | 36.3 | 12.1 | 5.6 |

The BET surface area, however, was 209 m$^2$/g which is greater than the BET surface area of the original HDS catalyst. This example, then, indicates the desirability of controlling the sulfiding temperature to assure good porosity for the regenerated HDS catalyst. This example, in comparison with the result (128.5 m$^2$/gm) in Table D for sulfiding alone (at a temperature of 700° C.) as the pretreatment, indicates the effect of reducing the sulfiding temperature on the BET surface area of the regenerated catalyst and points the way in which this important property may be achieved when required. Thus, whenever the regeneration process is not successful because the BET surface area after regeneration is not sufficiently greater than that of the spent catalyst so as to restore the porosity to a value allowing the regenerated HDS catalyst to be reused, modification of the sulfiding temperature is indicated. A sulfiding temperature in the order of 556° C. has been found to be preferred in many cases.

EXAMPLE 4

Same as Example 3 except the spent cobalt/molybdenum HDS catalyst sample was first calcined as in Example 2.

TABLE F

| | Percent Metals Removal | | | | |
|---|---|---|---|---|---|
| Pretreatment | Ni | V | Co | Al | Mo |
| Calcined and Sulfided | 48.3 | 67.8 | 39.6 | 11.9 | 9.2 |

The BET surface area of the regenerated HDS catalyst was 165.2 m$^2$/g. Again, this should be compared with the corresponding value (51 m$^2$/gm) in Table D, further showing the importance of controlling the sulfiding temperature to around 556° C. rather than the higher value of 700° C. as in Table D.

As noted with respect to Examples 1 and 2, the two pretreatment steps of sulfiding alone or of calcining and sulfiding appear to most favorably affect metals removal while still achieving a porosity approaching that of the original HDS catalyst material particularly if the sulfiding temperature is controlled as above.

EXAMPLE 5

Samples of the spent cobalt/molybdenum HDS catalyst as in the above Examples were calcined as in Example 2 and sulfided at the preferred temperature of 556° C. with flowing gases at different concentrations of hydrogen sulfide, at different flow rates and for different sulfiding times in order to determine the effect of varying amounts of hydrogen sulfide per gram of HDS catalyst on the regeneration process. The samples were then leached as in Example 2. The treatments were as follows:

TABLE G

| # | % hydrogen sulfide (in carrier) | flow rate (cm³/min-gm) | temperature (°C.) | time (hr) | amount (cm³/gm) |
|---|---|---|---|---|---|
| (a) | 5.0 | 60 | 556 | 1 | 18 |
| (b) | 5.0 | 620 | 556 | 16 | 2976 |
| (c) | 5.0 | 620 | 556 | 4 | 744 |
| (d) | 5.0 | 620 | 556 | 2 | 372 |
| (e) | 50.0 | 60 | 400 | 2 | 360 |
| (f) | 50.0 | 60 | 556 | 2 | 360 |
| (g) | 50.0 | 600 | 556 | 2 | 3600 |
| (h) | 100.0 | 600 | 556 | 2 | 7200 |

After leaching the results were as follows:

TABLE H

| | Percent Metals Removal | | | | |
|---|---|---|---|---|---|
| # | Ni | V | Co | Al | Mo |
| (a) | 30.6 | 27.4 | 45.1 | 9.7 | 15.9 |
| (b) | 49.3 | 70.1 | 41.0 | 10.1 | 5.6 |
| (c) | 46.2 | 64.7 | 40.0 | 9.1 | 7.8 |
| (d) | 37.8 | 59.6 | 35.0 | 10.5 | 8.3 |
| (e) | 27.6 | 51.0 | 35.0 | 16.2 | 11.3 |
| (f) | 49.7 | 61.9 | 36.8 | 10.1 | 8.3 |
| (g) | 56.1 | 65.0 | 38.6 | 9.5 | 6.9 |
| (h) | 59.0 | 69.4 | 40.0 | 9.4 | 5.6 |

Tables G and H illustrate that although the amount of hydrogen sulfide to which each gram of catalyst is treated may be varied over a wide range without substantial effect, there does appear to be a lower limit below which the metal removal effects are not sufficient. That lower limit is not apparent from these tables, but the value of 18 cm³/gm is obviously too low because the removals of nickel and especially vanadium are much too low and, as well, the removal of molybdenum is too high, Table H. However, the total amount of about 360 cm³/gm of HDS catalyst appears to be adequate for effecting the necessary metals removal. Thus, the lower limit would appear to lie somewhere between 360 cm³/gm and 18 cm³/gm and it has been found that a lower limit to this value can be stated as being about 60 cm³/gm and, indeed, this value is used in later examples.

Another interesting factor revealed by Tables G and H is that temperatures lower than the usually preferred 556° C. may be used to effect a significant reduction in nickel removal without sacrificing too much vanadium removal. This is illustrated by sample (e) in Tables G and H and, in what follows, may be used to advantage where the HDS catalyst contains nickel as an active metal ingredient.

In order best to illustrate the above, the following Examples relate to HDS catalysts involving an active metal ingredient which is also a contaminating metal when picked up in the HDS process.

EXAMPLE 6

A typical nickel/molybdenum HDS catalyst in its fresh state had the following characteristics:

| MoO | 15.5% |
|---|---|
| NiO | 2.9% |
| SiO | Trace |
| Length (avg) | 4 mm |
| Diameter (avg) | 1 mm |
| Surface area | 300 m²/g |

-continued

| Pore volume | 0.8 cm³/g |
|---|---|

After this type of HDS catalyst had been deactivated by a build-up of carbon and metals (Ni and V) in an HDS reactor, it had an impurities content of 2.6% V, 0.43% Ni (determined as total Ni content less the Ni content of fresh HDS catalyst), and 4.0% C. The spent HDS catalyst had a BET surface area of 230 m²/gram.

The deactivated HDS catalyst was pretreated by washing with solvents (acetone and toluene) to remove residual oil within the pores and on the external surface. The sample was sieved and particles which passed through 20 mesh screen were discarded.

The HDS catalyst was then dried in air at 110° C. in an atmospheric oven. Samples of HDS catalyst were subjected to a sequence of pretreatments comprising calcination to remove residual oil and carbon and sulfiding to convert metal impurities into sulfides and provide protection of the alumina, prior to leaching to remove metal impurities.

Conditions for calcining include packing the HDS catalyst in a stainless steel tube, heating and maintaining the tube at about 400° C. and passing 5% oxygen in a nitrogen carrier through the bed for 5 hours. After the bed was calcined, it was allowed to cool down to ambient temperature as inert gas (nitrogen) was passed through the bed.

Conditions for sulfiding pretreatment involve packing the spent HDS catalyst in a quartz tube, heating the tube at 400° C. while a mixture of 5% hydrogen sulfide in helium gas was passed through the bed at a flow rate of 10 cm³/min/g HDS catalyst for 2 hours. This calculates to a total amount of hydrogen sulfide per gram of catalyst equal to 60 cm³/gm of catalyst and represents about the minimum of sulfiding, based on hydrogen sulfide, to which the spent HDS catalyst should be pretreated according to this invention.

The leaching of metal impurities involved vigorously stirring a mixture of HDS catalyst sample and in aqueous solution containing 1.0 gram ferric ions per gram of catalyst and 0.5% by volume of sulfuric acid, the solution being maintained at about 100° C. followed by filtering the HDS catalyst from solution and washing with several volumes of distilled water.

Table I shows the percent removal of impurities from samples which were washed, calcined and sulfided as a function of contact time in the leaching solution.

TABLE I

| Impurities removal vs leaching time | | |
|---|---|---|
| | Metals Removal (Percent) | |
| Time (min) | Ni | V |
| 10 | 48 | 55 |
| 15 | 50 | 70 |
| 20 | 54 | 74 |

BET surface area of the samples increased over that of the spent HDS catalyst with leaching time, attaining a value for the sample leached for 20 minutes at 287 m²/g.

EXAMPLE 7

A laboratory prepared sample of an alumina-supported nickel/tungsten HDS catalyst in the fresh state had the following characteristics:

| | |
|---|---|
| W | 17.2% |
| Ni | 5.3% |
| Length (ave) | 4 mm |
| Diameter (ave) | 1 mm |
| Surface area | 300 m²/g |
| Pore volume | 0.78 cm/g |

After this type of HDS catalyst had been contaminated by a build up of metals (Ni and V) in a laboratory reactor, it had an impurities content of 4.2% V and 2.6% Ni (determined as total Ni content less the Ni content of fresh HDS catalyst).

The HDS catalyst was dried at 110° C. in an atmospheric oven. Samples were subjected to sulfiding pretreatment to convert metal impurities into sulfides and provide protection of the alumina, and leaching to remove metal impurities.

Conditions for sulfiding pretreatment and of leaching were the same as in Example 6.

Table J shows the percent removal of impurities from samples of sulfided HDS catalyst as a function of contact.

TABLE J

| Time (min) | Ni* | V |
|---|---|---|
| 10 | 32% | 67% |
| 20 | 52% | 95% |
| 30 | 60% | 100% |

BET surface area of the sample leached for 20 minutes was 270 m²/g.

What is claimed is:

1. In a method for regenerating a spent HDS catalyst having an alumina support by removing contaminating nickel and vanadium compounds therefrom while increasing the BET surface area and the pore diameter thereof to attain a porosity effective to allow the regenerated HDS catalyst to be reused as HDS catalyst, the steps of:

(a) sulfiding the spend HDS catalyst by passing a total amount of hydrogen sulfide of at least about 60 cm³ per gram of spent HDS catalyst through the spent catalyst under elevated temperature selected in the range of about 400° C. to about 700° C. to obtain, after leaching, the increased BET surface area;

(b) leaching the spent HDS catalyst obtained from step (a) in an acidic aqueous ferric ion containing solution at a temperature and for a time sufficient to remove an effective amount of the vanadium and nickel therefrom while increasing the pore diameter of the HDS catalyst; and (c) recovering regenerated catalyst from step (b) having porosity effective to allow the regenerated HDS catalyst to be reused.

2. In the method as defined in claim 1 wherein said spent HDS catalyst is a nickel/tungsten catalyst.

3. In the method as defined in claim 1 wherein said spent HDS catalyst is a cobalt/molybdenum catalyst.

4. In the method as defined in claim 1 wherein said spent HDS catalyst is a nickel/molybdenum catalyst.

5. In the method as defined in claim 1 wherein the spent HDS catalyst is washed with a solvent such as toluene, sieved and dried prior to step (a).

6. In the method as defined in claim 1 wherein the elevated temperature of step (a) is about 400° C.

7. In the method as defined in claim 1 wherein the elevated temperture of step (a) is about 556° C.

8. In the method as defined in claim 1 wherein the temperature and time of step (b) are about 100° C. and about 20 minutes respectively.

9. The method of regenerating HDS catalysts having an alumina substrate and containing molybdenum oxide and an oxide of a metal selected from the group consisting of cobalt, tungsten and nickel as active catalytic components thereof, which HDS catalyst has become deactivated by contamination with vanadium and nickel compounds with consequent reduction in the BET surface area of the spent HDS catalyst, which includes the steps of:

(a) sulfiding the deactivated HDS catalyst at elevated temperature in preparation for leaching contaminating nickel and vanadium therefrom to regenerate the spent HDS catalyst;

(b) leaching the sulfided deactivated HDS catalyst of step (a) in an acidic aqueous leaching solution containing ferric ions to solubilize the contaminating nickel and vanadium compounds which have become sulfided in step (a);

(c) recovering regenerated HDS catalyst from the leaching solution of step (b); and wherein step (a) is controlled to increase the BET surface area of the regenerated catalyst recovered in step (c) substantially as compared with the BET surface area of the deactivated HDS catalyst by controlling the temperature of step (a) to a temperature within the range of about 400° C. to not more than about 700° C.

10. The method as defined in claim 9 including the step of calcining the deactivated HDS catalyst at a temperature of about 400° C. prior to the sulfiding of step (a).

11. The method as defined in claim 10 wherein the temperature of step (a) is controlled at about 556° C.

12. The method as defined in claim 10 including the step of washing the deactivated HDS catalyst to remove oil therefrom prior to calcining.

13. The method as defined in claim 12 wherein the temperature of step (a) is controlled at about 556° C.

* * * * *